United States Patent [19]
Topolkaraev et al.

[11] Patent Number: 5,800,758
[45] Date of Patent: Sep. 1, 1998

[54] PROCESS FOR MAKING MICROPOROUS FILMS WITH IMPROVED PROPERTIES

[75] Inventors: Vasily Aramovich Topolkaraev; Fu-Jya Tsai, both of Appleton, Wis.

[73] Assignee: Kimberly-Clark Worldwide, Inc., Neenah, Wis.

[21] Appl. No.: 932,817

[22] Filed: Sep. 16, 1997

[51] Int. Cl.$^6$ ............................................. B29C 67/20
[52] U.S. Cl. .................. 264/154; 264/288.8; 264/289.6; 264/290.2; 264/346; 264/348
[58] Field of Search ..................... 264/41, 154, 288.8, 264/289.6, 290.2, 346, 348

[56] References Cited

U.S. PATENT DOCUMENTS

| | | | |
|---|---|---|---|
| 4,350,655 | 9/1982 | Hoge | 264/145 |
| 4,698,372 | 10/1987 | Moss | 521/145 |
| 4,791,144 | 12/1988 | Nagou et al. | 264/41 X |
| 4,814,124 | 3/1989 | Aoyama et al. | 264/41 |
| 4,921,653 | 5/1990 | Aoyama et al. | 264/41 |
| 5,008,296 | 4/1991 | Antoon, Jr. et al. | 521/91 |

FOREIGN PATENT DOCUMENTS

| | | | |
|---|---|---|---|
| 57-49523 | 3/1982 | Japan | 264/288.8 |
| 60-215034 | 10/1985 | Japan | 264/288.8 |

OTHER PUBLICATIONS

American Society for Testing Materials (ASTM) Designation: D 1238–95, "Standard Test Method for Flow Rates of Thermoplastics by Extrusion Plastometer," pp. 273–281, published Jan. 1996.

American Society for Testing Materials (ASTM) Designation: E 96–80, "Standard Test Methods for Water Vapor Transmission of Materials," pp. 742–751, published Feb. 1981.

Dullien, F.A.L., "Porous Media: Fluid Transport and Pore Structure," Academic Press, New York, 1979, pp. 78–83.

Germani, Mark S., "Application of Automated Electron Microscopy to Individual Particle Analysis," *American Laboratory*, vol. 25, No. 7, Apr. 1993, pp. 17–24.

Nakamura, Shunichi, et al., "Microporous Polypropylene Sheets," *Industrial & Engineering Chemistry Research*, American Chemical Society, vol. 32, 1993, pp. 221–227.

Nakamura, Shunichi, et al., "Microporous Polypropylene Sheets Containing CaCo3 Filler," *Journal of Applied Polymer Science*, vol. 49, No. 1, 1993, pp. 143–150.

Vander Wood, T.B., "Introduction to Automated Particle Analysis," *Proceedings of 52nd Annual Meeting of Microscopy Society of America—New Orleans—Jul. 31–Aug. 5, 1994*, pp. 398–399.

Monte, S.J. et al. "Processing of Composites with Titanate Coupling Agents—A Review". Polymer Engineering and Science, vol. 24, No. 18 (Dec. 1984).

*Primary Examiner*—Leo B. Tentoni
*Attorney, Agent, or Firm*—Paul Yee

[57] ABSTRACT

A distinctive technique for making a microporous film includes a stretching of a layer composed of a polymer material and at least about 5 wt % of a particulate filler material. The particulate filler material has been distinctively treated with an operative amount of surface-active material having a HLB value of not less than about 6. Desirably, the stretching includes a biaxial stretching of the polymer layer.

23 Claims, 1 Drawing Sheet

FIG.1

PROCESS FOR MAKING MICROPOROUS FILMS WITH IMPROVED PROPERTIES

FIELD OF THE INVENTION

The present invention relates to the manufacture of synthetic films. More particularly, the invention relates to a method and apparatus for making synthetic films which are porous and exhibit improved mechanical properties.

BACKGROUND OF THE INVENTION

Porous films have been made by incorporating filler particles into a polymer material and stretching the material to form a film having voids induced. Such techniques, however, have not been adequate for forming thin porous films because the resultant films have been excessively thick or have inadequate mechanical properties, such as low strength and low toughness.

Porous films have also been made by employing conventional phase separation methods. Such methods generally involve mixing a polymer resin with a diluent or a plasticizer, quenching the polymer solution in a liquid medium to induce phase separation, and washing away the diluent to leave behind an interconnected porous structure. Other techniques have employed a blowing agent or a swelling agent to create a microporous structure. Still other techniques have employed an environmental crazing to prepare porous materials.

There have also been various conventional approaches for modifying a film with surfactant to impart hydrophilic properties. The film can be rendered hydrophilic by coating or chemically grafting the surfactant onto the surface of the film. Surfactant also can be compounded with the resin to impart hydrophilicity to the material. The coating technique typically does not provide retained wettability, and the surfactant can be easily washed from the surface of the film. The chemical grafting technique usually requires an additional and expensive processing step, and does not provide sufficient wettability for the interior of the material. The compounding of the surfactant with the polymer resin can provide partial wettability, but there can be an inadequate diffusion of the surfactant to the surface of the film.

When producing porous polymer films, known conventional techniques have stretched sheets or layers composed of precursor materials which have contained up to 65 wt % of filler materials. When the precursor material is formed into a layer and then stretched, however, the conventional forming techniques, such as those described above, have not been able to produce porous films having desired physical properties. In particular, there has been a continued need for improved techniques for producing porous films having desired combinations of small thickness, high wettability, high permeability to liquid and water vapor, high elongation and high tensile strength.

BRIEF DESCRIPTION OF THE INVENTION

Generally stated, the present invention provides a distinctive technique for making porous film. The technique includes a stretching of a layer composed of a polymer material and a selected amount of a particulate filler material. The particulate filler material has been treated with an operative amount of surface-active material having at least a minimum Hydrophile-Lipophile Balance (HLB) value. In particular aspects, the stretching includes a biaxial stretching of the polymer layer to provide a microporous film.

In its various aspects, the technique of the invention can effectively produce porous films with desired morphologies. In particular aspects, the technique can efficiently produce films having desired combinations of small thickness, high wettability, high water-accessibility, high water vapor transmission rate, high tensile strength, high elongation to break and improved ability to be further processed to form other articles of manufacture.

BRIEF DESCRIPTION OF THE DRAWINGS

The present invention will be more fully understood and further advantages will become apparent when reference is made to the followed detailed description of the invention and the drawings, in which.

DETAILED DESCRIPTION OF THE INVENTION

Figure 1:
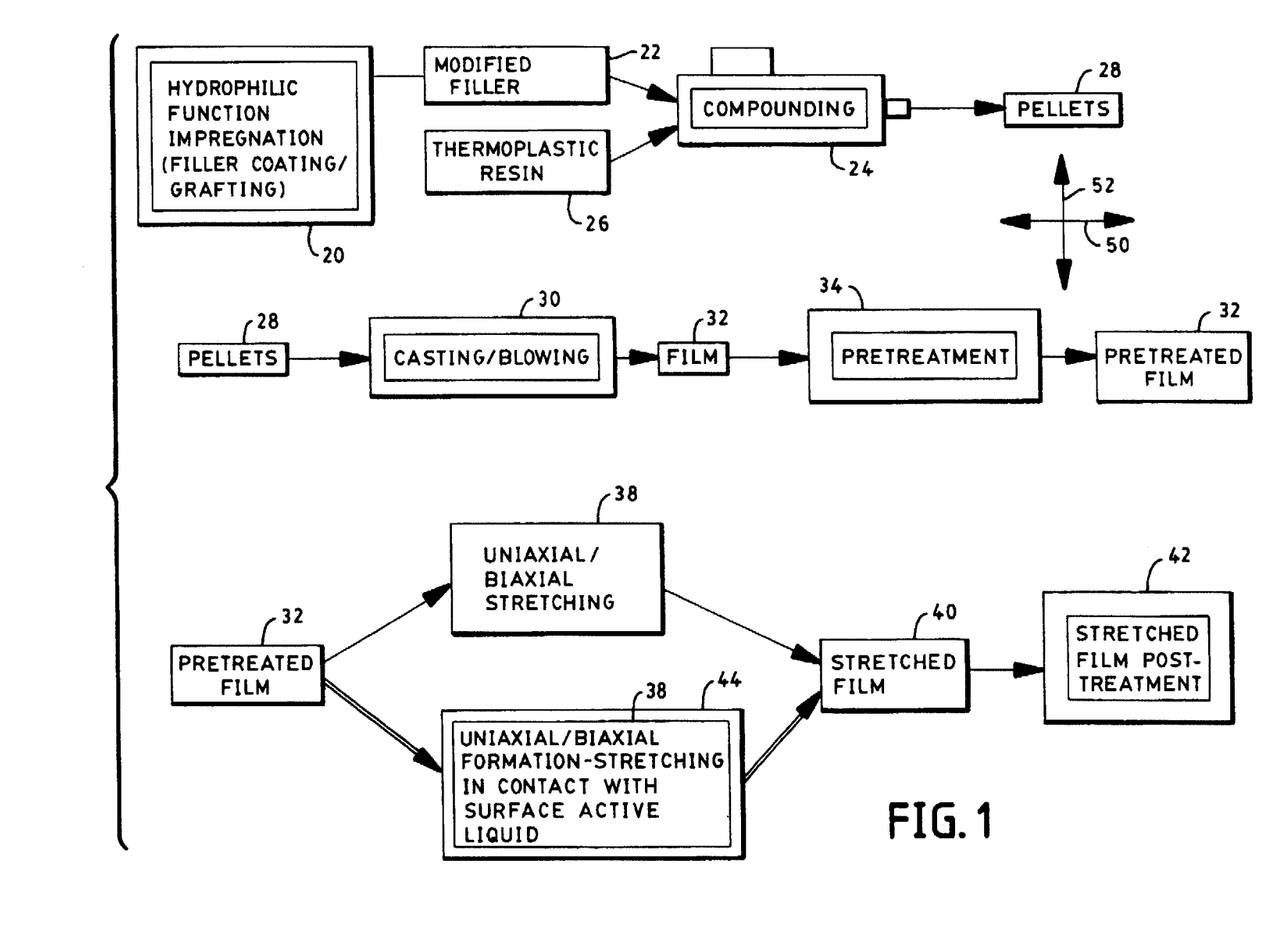
FIG. 1 shows a representative schematic view of the method and apparatus provided by the present invention.

As representatively shown in FIG. 1, a method and apparatus for making a porous film 40 provides for a stretching of a substantially continuous layer 32 composed of a polymer material and a minimum amount of a selected particulate filler material. The particulate filler material has been treated with an operative amount of a selected surface-active material. In desired aspects, the source material includes a thermoplastic, orientable material and at least about 5 wt % of a particulate filler material, where the weight percentage is determined with respect to a total weight of the overall source material. Desirably, the source material includes about 30 wt % of the filler material. In particular aspects of the invention, the particles of filler material have desirably been treated with an operative amount of surface-active material having a Hydrophile-Lipophile Balance (HLB) value of at least about 6, and in other aspects, the particles can have a selected particle size distribution.

Desirably, the surface-active liquid can include a surfactant which operatively reduces the surface tension of water, and/or reduces a coefficient of friction at the surfaces of the filler particles. In particular aspects of the invention, the layer 32 may be subjected to a selected plurality stretching operations, such as a biaxial stretching operation. Other aspects of the invention can include a formation-stretching of the substantially continuous layer 32 while the layer is in an operably effective contact with a second, formation-quantity of surface-active fluid, such as a surface-active liquid.

When compounding the polymer resin and source material, the filler content can be varied and may be within the range of about 30–65 wt %, and the average particle size of the filler can be within the range of about 0.1–5 microns. The draw elongation during the stretching of the filled polymer sheets or layers can be within the range of about 100–400%, and can provide a stretched film having a porosity value of up to about 70–80%. The draw elongation can be determined with the formula: $100*(L_f-L_i)/L_i$; where $L_i$ is the initial length of a measured quantity of film prior to elongation, and $L_f$ is the final length of that film after stretching.

The various aspects of the method and apparatus of the invention can provide a microporous film which exhibits improved wicking, can more quickly bring water or other liquid into the interior of a fibrous article, and can accelerate the dissolution kinetics for articles which are intended to be flushable. In addition, the invention can provide a microporous film which can help provide for improved absorbency, improved distribution of liquid, improved breathability in articles, such as surgical gowns and diapers, improved tactile and aesthetic properties, enhanced biodegradability, and/or an improved ability to be flushed down an ordinary, conventional toilet. The films may, for example, be particularly useful for producing flushable personal care products, such as diapers, training pants, tampons, feminine pads, pantiliners, and the like.

It has been found that the wettability should be provided not only on the surface of the film but also within the porous or microporous channel structure to provide a driving force for liquid flow into intrinsic, internal regions of the material. A major factor which can affect the access of liquid (e.g. water) into the microporous film structure can include the specific permeability of the film material, as determined by the pore geometry (pore size and size distribution) and by the connectivity and tortuosity of the three-dimensional pore structure. Other major factors can include the liquid viscosity, the liquid surface tension, the contact angle of liquid with microporous media, and the thickness of the material. As a result, the technique of the invention has been configured to provide porous film materials with specific microporous structures having controlled liquid permeability and to provide for particular interactions between the liquid with the microporous structure, such as by reducing or otherwise affecting the liquid viscosity and surface tension.

Important factors which can contribute to a desired low level of rigidity in the porous film 40 include process parameters which can produce a high level of film porosity, an open-cell porous morphology, and a flexible polymer matrix in the film. Additional important factors which can affect the strength of the porous film include processing parameters which can provide for desired configurations and combinations of pore volume content, tensile strength in the continuous polymer phase of the formed film, pore size and pore size distribution, and arrangement of pores. Such parameters can include, for example, the particular processing history, such as provided by compounding, stretching, annealing, quenching and the like, as well as the various combinations thereof.

In the present invention, the polymer layer 32 is produced from a source material 28 which includes a thermoplastic, orientable material, such as a material composed of thermoplastic and orientable polymers, copolymers, blends, mixtures, compounds and other combinations thereof. Desirably, the thermoplastic materials do not include highly reactive groups.

In particular arrangements of the invention, the source material 28 can be a polyolefinic material. For example, the source material may include homopolymers of polyethylene or polypropylene, or may include copolymers of ethylene and polypropylene. In other arrangements, the source material may include another polymer material, such as a polyether, a copolyether, a polyamid, a copolyamid, a polyester or a copolyester, as well as copolymers, blends, mixtures and other combinations thereof.

The thermoplastic material is desirably melt processible, and in particular aspects of the invention, the material can have a melt flow rate (MFR) value of not less than about 0.2 g/10 minutes (based on ASTM D1238). Alternatively, the MFR value can be not less than about 0.4 g/10 minutes, and optionally, can be not less than about 0.8 g/10 minutes. In other aspects of the invention, the MFR value can be not more than 100 g/10 minutes. Alternatively, the MFR value can be not more than about 50 g/10 minutes, and optionally, can be not more than about 20 g/10 minutes to provide desired levels of processibility.

Such a melt processible, thermoplastic polymeric material is also stretchable in its solid state to allow a stretch processing of the filled film. To achieve the desired solid state performance, the polymer material is configured and selected to exhibit a particular ratio between the material's true tensile fracture stress (tensile force at failure divided by the cross-sectional area of the failed specimen), $\sigma_F$, and the material's stress at yielding, $\sigma_Y$. In particular aspects of the invention, the ratio or quotient between the true tensile strength and the yield strength ($\sigma_F/\sigma_Y$) is desirably not less than 1, and alternatively is not less than 5. Optionally, the ratio between the true tensile strength and the yield stress is not less than 10. In other aspects of the invention, the ratio between the true tensile strength and yield strength can be not more than 150, and alternatively can be not more than about 100. Optionally, the ratio between true tensile strength and yield stress can be not more than about 50.

Examples of suitable melt processible, thermoplastic materials which allow an appropriate drawing in their solid state can be provided by a homopolymer polyethylene and copolymers of ethylene and $C_4$–$C_8$ α-olefin monomer. Particularly useful examples are known as "super-octene" resins. The "super-octene" resins can include the linear low density polyethylene (LLDPE) resins that are produced by the polymerization of ethylene and 1-octene comonomer, such as those designated as DOWLEX Next Generation (NG) resins, available from Dow Chemical Corporation, a business with offices located in Midland, Mich. The "super-octene" resins are made with a catalyst system other than "metallocene" or Insite®. The Next Generation DOWLEX resins are very suitable for demanding stretch applications. Suitable "super-octene" resins useful in the present invention include, for example, DOWLEX NG 3347A LLDPE resin which contain about 7% octene (nominal weight %) and 93% ethylene. Other resins suitable for this invention may include DOWLEX NG 3310. Still other suitable materials include, for example, random copolymers, such as random copolymers containing propylene and ethylene, for example Union Carbide 6D81 and 6D82 random copolymers containing 5.5% ethylene, which are available from Union Carbide Corporation, the business having offices in Danbury, Conn.

The polymer resin or source material may contain small amounts (e.g. about 0.05 to 5 parts of additive to 100 parts of resin) of processing additives and solid-state performance modifiers. Such additives may include calcium stearate or other acid scavengers, organosilicone compounds, silicon glycol copolymers, olefinic elastomers, and low molecular weight paraffin's or other lubricating additives. The various additives can have a plasticizing effect, can improve the strength and softness of the film, and can help facilitate one or more of the extrusion, film casting, and stretching processes.

The source material for the film 40 can also include one or more supplemental materials, and the supplemental material may include a filler material, as well as a surfactant or other surface-active material. The filler material can be a particulate material which can help provide porosity-initiating, debonding sites to enhance the desired formation of pores during the various stretching operations applied to the film. The surface-active liquid may be selectively introduced into the polymer material during its compounding phase. This can provide an internal source of the surface-active liquid in the situations where the surface-active liquid becomes operatively located at the interfaces within the polymer material, and/or where of the compounded surface-active liquid operatively migrates to the surface of the film and to any interfaces which are present in the polymer material or are evolved in the polymer material by subsequent processing. The potential candidates for the surface-active liquid can include the silicone-based surfactants which can provide very low surface energies and allow an efficient migration of the liquid to the various physical interfaces within the polymer material.

In particular aspects of the invention, however, the filler particles can be configured and modified to provide distinctive, surface-modified particles which can help enhance the subsequent stretching operations. For example, the particular modification of the surface of the filler particles by the incorporation of lubricating and release agents can facilitate the formation of microvoids and the development of the desired porous structure by reducing agglomeration, as well as reducing adhesion and friction at the filler-resin interface.

In addition to facilitating the microvoid initiation and pore growth, the surface-active liquid can be employed to carry or otherwise provide a selected hydrophilic modifier to new interfaces which are generated during the formation of the porous structures within the stretched film 40. For example, low molecular weight surfactants can be dissolved in a surface-active liquid, and an advantageous, "in-situ" modification of the generated microporous structure can be achieved by the absorption of the hydrophilic modifiers on the newly created interfaces at the pore walls. In particular, the monodisperse ethoxylates, silicon glycol copolymers and branched hydrocarbon chain sulfates can be very effective as wettability modifiers for microporous films. A high wetting rate and a high wetting effectiveness can be achieved with these surfactants. Both the surfactant type and the hydrocarbon chain structure of the surfactant can exert a significant influence on the rate and effectiveness of the wetting.

Thus, the surface modification of the fillers using selected hydrophilic surfactants can also provide a controlled interaction with aqueous liquids, and can allow desired amounts of liquid access into the porous structure. Configurations of the invention which incorporate particularly selected, surface-modified fillers can also provide higher production speeds for the porous film, and can reduce the production costs of the film. In addition, the selected filler material can help preserve the pores that are generated during the various stretching operations.

Where the supplemental material includes a surface-active material, such as a surfactant or other material having a low surface energy (e.g. silicone oil), the surface-active material can help reduce the surface energy of the film as well as provide lubrication among the polymer segments which form the film. The reduced surface energy and lubrication can help create a "sliding effect" during the subsequent stretching operations.

The supplemental filler material can be organic or inorganic, and is desirably in the form of individual, discrete particles. Examples of an inorganic filler can include metal oxides, as well as hydroxides, carbonates and sulfates of metals. Other suitable inorganic fillers can include, for example, calcium carbonate, various kinds of clay, silica, alumina, barium sulfate, sodium carbonate, magnesium carbonate, magnesium sulfate, barium carbonate, kaolin, carbon, calcium oxide, magnesium oxide, aluminum hydroxide, titanium dioxide, powdered metals, glass microspheres, or vugular void-containing particles. Still other inorganic fillers can include those with particles having higher aspect ratios, such as talc, mica, and wollastonite, but such fillers may be less effective because they can act as a reinforcing elements, thus increasing rigidity of the filled resin and inhibiting void growth by restraining plastic yielding and drawing of the polymer resin. Representative organic fillers can include, for example, pulp powders, wood powders, cellulose derivatives, chitin, chitozan powder, powders of highly crystalline, high melting polymers, beads of highly crosslinked polymers, powders of organosilicones, and the like, as well as combinations and derivatives thereof.

In particular aspects of the invention, the fillers can have an average particle size which is not more than about 10 microns (μm). Alternatively, the average particle size can be not more than about 5 μm, and optionally, can be not more than about 1 μm to provide improved processibility. In other aspects of the invention, the top cut particle size is not more than about 50 μm. Alternatively, and the top cut particle size can be not more than about 20 μm, and optionally can be not more than about 8 μm to provide improved processibility during the formation of film having the desired size and porous structure. The fillers may also be surface-modified by the incorporation of surfactants, and/or other materials, such as stearic or behenic acid, which can be employed to improve the processibility of the source material.

In further aspects of the invention, the amount of filler material can be not less than about 5 wt % of the total composite weight of the polymer and filler materials. Alternatively, the amount of filler material is not less than 10 wt %, and optionally is not less than 20 wt %. In other aspects of the invention, the amount of filler material can up to about 90 wt %. Alternatively, the amount of filler material can be not more than about 80 wt % and optionally can be not more than about 70 wt %. Particular arrangements can incorporate about 30 wt % of filler material which is desirably in the form of particles.

Suitable filler materials can include one or more of the following:

1. SUPERMITE, an ultrafine ground $CaCO_3$, which is available from ECC International, a business having offices located in Atlanta, Ga. 30342, 5775 Peachtree-Dunwoody Road. This material can have a top cut particle size of about 8 μm and a mean particle size of about 1 μm. This filler can be coated with a surfactant, such as DOW CORNING 193 surfactant, before the compounding or other combining with the source material. The filler can also be coated with other appropriate surfactants, such as those mentioned elsewhere in the present description.

2. SUPERCOAT, a coated ultrafine ground $CaCO_3$ which is available from ECC International, a business having offices located in Atlanta, Ga. 30342, 5775 Peachtree-Dunwoody Road. This material can have a top cut particle size of about 8 μm and a mean particle size of about 1 μm.

3. OMYACARB UF, high purity, ultrafine, wet ground $CaCO_3$, which is available from OMYA, Inc., a business having offices located in Proctor, Vt. 05765. This material can have a top cut particle size of about 4 μm and a average particle size of about 0.7 μm, and can provide good processibility. This filler can be coated with a surfactant, such as Dow Corning 193 surfactant, before the compounding or other combining with the source material. The filler can also be coated with other appropriate surfactants, such as those mentioned elsewhere in the present description.

4. OMYACARB UFT $CaCO_3$, ultrafine pigment surface-coated with stearic acid, which is available from OMYA, Inc. This material can have a top cut particle size of about 4 μm and a mean particle size of about 0.7 μm, and can provide good processibility.

By modifying the surface of the filler particles to become substantially and/or significantly hydrophilic, at least a partial wettability of the internal, microporous structure within the bulk of the film can be achieved. For example, silicon glycol copolymers, ethylene glycol oligomers, acrylic acid, hydrogen-bonded complexes, and other hydrophilic surfactants can be used as the surface modifiers. The fillers may be also subjected to a surface treatment with various coatings, surfactants or other surface-active materials to impart a desired affinity to the polymer resin, to reduce filler agglomeration, and/or to improve the dispersion of the filler, as well as to provide the controlled interaction with appointed fluids, such as body fluids, blood, water or other aqueous liquids. The surface-active materials can also be selected to provide for a plasticizing effect which can improve the drawing of the polymer layer 32 and enhance the formation of desired micropores within the drawn film 40.

In addition to promoting the formation of microvoids and promoting increased water access, the modified fillers can optionally be configured to render other desired functional attributes to the film material. For example, calcium carbonate can increase the opacity and softness of the material and can reduce malodor. Deodorant properties may also be imparted into the film material by using other, specifically treated microporous fillers; e.g., silica gel particles.

The surface-active material may be blended or otherwise incorporated into the source material employing various techniques. Various conventional techniques may also be employed for modifying a porous film with surfactant to impart hydrophilic properties. The film can, for example, be rendered hydrophilic by a coating or a chemical grafting of a surfactant onto the surface of the film. The surfactant also can be compounded with the polymer resin to impart hydrophilicity to the composite material. The coating technique, however, typically has not provided a sufficient level of retained wettability since the surfactant may be easily washed from the surface of the film. The grafting technique has typically required an additional and expensive processing step, and does not provide sufficient wettability within the interior of the material. The compounding of the surfactant with the polymer resin can provide a partial wettability, but there can be an inadequate diffusion of the surfactant to the surfaces of the film.

The various aspects of the invention, however, can advantageously incorporate the surface-active material by having it carried into the source material and polymer layer 32 by the filler particles, particularly by the outer surfaces of the filler particles. As a result, desired levels of wettability and other desired physical properties can be provided not only on the outer, major facing surfaces of the film, but also within the various porous, microporous or channel structures within the bulk of the film material to provide a mechanism for driving the liquid flow into the intrinsic, interior regions of the material.

In particular, the aspect of modifying the filler particles with hydrophilic surfactant can advantageously provide an increase in the apparent volume content of the surfactant associated with the filler particles, and can provide a substantially direct location and placement of the surfactant at the various physical interfaces and help modify the interior structure of the formed, microporous film. In addition, this aspect of the invention can provide for greater retained wettability as a result of better coupling of surfactant with a polar filler surface, and can provide for a shorter path for surfactant migration to the outer, major surfaces of the film.

To impart the operative hydrophilic function into the microporous film, the filler particles can be modified with hydrophilic surfactant by a operative technique, such as by coating or grafting. The process of modifying the surfaces of the filler particles can, for example, include a coating of the surfactant onto the filler material employing a solvent-surfactant solution. For example, acetone or isopropanol can be employed as the solvent. After a solution coating of the filler material and a partial solvent evaporation, the surface-modified filler can be dried in an oven, and may then be further ground into particles. For example, the filler material can be dried under vacuum in a vacuum oven, and the drying temperature can be about 60° C. The amount of the surfactant at the filler surfaces can be controlled by regulating the weight percentage of the surfactant added to the filler weight. In particular configurations, the amount of surfactant was varied from about 3 wt %, based on the total weight of the filler, to about 10 wt %. A desired surfactant concentration can be about 6 wt %. The amount of surfactant on a dried filler was measured by thermal gravimetric analysis (TGA).

The filler can be also be modified with surfactant by employing a high shear mixer such as a HENSCHEL high intensity mixer, or can be coated by using various blending techniques. For example, the process of the filler modification can be scaled up by employing a rubber blender and tumble blending technique to incorporate a surfactant loading of about 6 wt %.

In particular aspects of the invention, the surfactant, or other surface-active material, can have a Hydrophile-Lipophile Balance (HLB) number which is not more than about 18. Alternatively, the HLB number is not more than about 16, and optionally is not more than about 15. In other aspects of the invention, the HLB number is not less than about 6. Alternatively, the HLB number is not less than about 8, and optionally the HLB number is not less than about 12. When the HLB number is too low, there can be insufficient wettability. When the HLB number is too high, the surfactant may have insufficient adhesion to the polymer matrix of the source material, and may be too easily washed away during use. The HLB numbers of commercially available surfactants can, for example, be found in McCUTCHEON's Vol 2: Functional Materials, 1995.

Suitable surfactants can include silicon glycol copolymers, carboxilated alcohol ethoxylates, various ethoxylated alcohols, ethoxylated alkyl phenols, ethoxylated fatty esters and the like, as well as combinations thereof.

Other suitable surfactants can, for example, include one or more of the following:

(1) surfactants composed of ethoxylated alkyl phenols, such as IGEPAL RC-620, RC-630, CA-620, 630, 720, CO-530, 610, 630, 660, 710 and 730, which are available from Rhone-Poulenc, a business having offices located in Cranbury, N.J.

(2) surfactants composed of silicone glycol copolymers, such as Dow Corning D190, D193, FF400, and D1315, which are available from Dow Corning, a business having offices located in Midland, Mich.

(3) surfactants composed of ethoxylated mono- and diglycerides, such as Mazel 80 MGK, Masil SF 19, and Mazel 165C, which are available from PPG Industries, a business having offices located in Gurnee, Ill. 60031.

(4) surfactants composed of ethoxylated alcohols, such as Genapol 26-L-98N, Genapol 26-L-60N, and Genapol 26-L-5, which are available from Hoechst Celanese Corp., a business having offices located in Charlotte, N.C. 28217.

(5) surfactants composed of carboxilated alcohol ethoxylates, such as Marlowet 4700 and Marlowet 4703, which are available from Huls America Inc., a business having offices located in Piscataway, N.J. 08854.

(6) ethoxylated fatty esters, such as Pationic 138C, Pationic 122A, and Pationic SSL, which are available from R.I.T.A. Corp., a business having offices located in Woodstock, Ill. 60098.

The amount of surfactant or other surface-active material can be at least about 0.5 wt % of the total, composite source material. Alternatively, the amount of surfactant can be at least about 1 wt %, and optionally, can be at least about 2 wt %. In other aspects of the invention, the amount of the surfactant can be not more than about 20 wt %. Alternatively, the amount of surfactant can be not more than about 15 wt %, and optionally, can be not more than about 10 wt %.

Detailed analyses were conducted to make the distinctive selections of the various processing parameters of the invention. For example, a particular assessment pertained to the dependence of the size of the initiated micropores upon the surface energy and the draw stress applied to the film. This dependence can be described by the Griffith criterion, which pertains to the tensile stress ($\sigma$) associated with the loss in stability of microdefects. The criterion relates the tensile stress ($\sigma$) to the size "r" of the microdefects in the polymer material of the layer 32 and to the surface energy ($\gamma$) between the polymer material and the environment. According to the Griffith criterion, $$\sigma = (4Y \gamma/r)^{1/2}; \quad (1)$$

where:
Y=Young's modulus of the film material;
$\gamma$=surface energy between the film material and the environment;
r=size of the microdefect; and
$\sigma$=stress associated with the loss in stability of a microdefect with size "r".

Thus, the lower the surface energy ($\gamma$) between the polymer material and its surrounding environment, the lower the stress ($\sigma$) required to create a micropore in a material having Young's modulus of "Y". In addition, the number of the initiated pores per unit volume can be increased due to the smaller dimensions of the microdefects involved in the process of forming the micropores.

An analytical prediction for the debonding stress, $\sigma_d$, can be made by considering the conditions at which the energy balance will be favorable for the propagation of microdefects along the interfaces between polymer resin and the individual filler particles. The dependence of the debonding stress, $\sigma_d$, upon the particle radius (R), the interfacial energy ($\gamma$), and the polymer matrix elastic modulus (E) can be represented, in a simplified form, by the following formula:

$$\sigma_d = [(4\pi \gamma E)/(A \ q \ R)]^{1/2} \quad (2)$$

where "A" is a geometrical constant, and "q" is a factor which depends on the filler loading (particle separation).

This formula can be employed to predict of the debonding stress and the efficiency of the microvoid nucleation by a filler particle, as a function of the filler loading, the size of the filler particles, the characteristics of the interface between the filler particle and polymer resin, and the mechanical properties of the polymer resin.

Accordingly, it is believed that an increase of the filler particle loading in the polymer layer 32, and the consequent reduction in the separation distance between the individual particles, can reduce the debonding stress required for the nucleation of pores or voids in the polymer layer, as a result of the overlapping of stress distribution fields from adjacent particles. It is believed that the debonding stress can be reduced at the high filler loading, and the void nucleation can be more effective when the particle separation is less than the particle diameter (e.g. the filler loading is more than 15 vol %). This condition provides an advantageous overlapping of the stress distribution fields. Thus, the required debonding stress should decrease with particulate filler loadings greater than about 15 vol %, or with particulate filler loadings greater than about 30–35 wt %.

In addition, it is noted that a relatively broad particle size distribution can be incorporated to provide a better space filling and an enhanced interaction (stress field overlap) of adjacent particles. In contrast, a substantially unimodal, or uniform particle size distribution can reduce the efficiency of the space filling because of geometrical packing restrictions, and can reduce the efficiency of the debonding and void nucleation operations.

It is also noted that the interfacial surface energy and the various interactions between the particle surfaces and the immediately adjacent polymer material can play an important role in the debonding process. A reduction of such interactions, such as reductions in the surface energy and the adhesion, at the filler-resin interface can significantly reduce the debonding stress and promote the nucleation of pores and voids. In contrast, an excessively high surface energy or high adhesion, can suppress the debonding process and prevent the filler particle from providing a nucleation site for void growth.

In particular aspects of the invention, a selected treatment of the surfaces of the filler particles to provide a low coefficient of friction at the filler-resin interface can significantly enhance the area of debonding between the individual filler particles and the surrounding polymer resin, and can provide more favorable conditions for the desired nucleation and growth of microvoids.

There has also been found a dependence between the debonding stress and other parameters of the polymer material, such as the polymeric resin modulus and the particle size. Furthermore, it is also possible to estimate minimum critical particle size (diameter), $D_{CR}$, at which debonding is unlikely to occur, and the particle cannot be considered as an effective void nucleation site. With reference to the above equation (2), the debonding stress, $\sigma_d$, can be reduced with an increase of the particle size. In contrast, the debonding stress will dramatically increase when the particle sizes are reduced into the submicron range. An increase in the resin modulus can allow for an increase in the available debonding stress. Since the tensile stress applied to the filled polymer material during the stretch processing, is limited by the available drawing stress, the particles exhibiting a debonding stress higher than the maximum allowable drawing stress cannot be debonded. Therefore, the excessively small particles, with sizes less than the critical particle size, will not effectively generate desired levels of void nucleation. Accordingly, it can be important to reduce or substantially eliminate such particle sizes from the small-particle-size tail within the particle size distribution of the filler material.

The critical particle size can be estimated by using the typical values for the resin modulus and interfacial surface energy. Accordingly, an approximate critical particle size for polyethylene is in the range of about 0.1–0.2 microns (μm) and for polypropylene is in the range of about 0.05–0.1 microns. This indicates that very fine grades of filler with particle size below about 0.2 microns can be less effective in the void nucleation operation, as compared to larger particle sizes. Desirably the filler particle size is at least about 0.5 microns. At the same time, the filler grades with a particle size more than about 5 microns, while efficient for void nucleation, can lead to material failure during stretching due to the frequent formation of critical flaws.

For an efficient microvoid nucleation by the filler particles, the size of the filler particles should be above the critical size for debonding, have a broad size distribution to increase the level of space filling, and should have a clear top cut size to prevent flaw formation. The interface should also be provided with a low surface energy, a low adhesion, and a low coefficient of friction. In addition, the filler loading should be high to provide numerous nucleation sites, and the resin modulus should be low to reduce the required amount of applied debonding stress.

A proper selection of the polymer resin material can also be important to providing a composite polymer layer 32, composed of polymer resin and filler particles, wherein the composite has a desired combination of high ductility and strength. The yield stress of the filled polymer layer can be estimated by assuming that the effective load-bearing cross-section of the polymer material decreases as a result of interfacial debonding and the load redistribution within the matrix of polymer material. For a cubic array of spherical particles that are partially detached from the polymer matrix, one can estimate the effective load-bearing cross-sectional area, $A_{ef}$. Assuming further that only the matrix is load bearing at the yield point, the yield stress of the composite can be given as $$\sigma_{YC} = \sigma_{YP}(1 - \beta_Y V^{2/3}) \tag{3}$$

where a $\sigma_{YC}$ is the yield stress of the composite; $\sigma_{YP}$ is a the yield stress of the polymer resin; $\beta_Y$ is a geometrical parameter close to 1, and V is the filler volume content.

The tensile fracture stress can be estimated by assuming that the effective load-bearing cross-section is decreased by the elongated voids formed within the drawn composite. The voids contribute to the total cross-sectional area at the fracture but are not load bearing. It is suggested that the load is carried by the drawn polymer ligaments existing between the voids, and that fracture occurred when these ligaments reached their true fracture stress. As a result, the true fracture stress of a stretched filled polymer can be represented by $$\sigma_{FC} = \sigma_{FP}(1 - \beta_F V^{2/3}) \tag{4}$$

where $\sigma_{FP}$ is the true fracture stress of the polymer resin, $\sigma_{FC}$ is the true fracture stress of the composite, and $\beta_F$ is a geometrical parameter which can have value between 2 and 3.

The filled polymer composite can be stretched in a ductile mode only if its fracture stress is larger than its yield stress to thereby allow loads sufficient for material drawing and stretching. A ductile-to-quasi-brittle transition occurs because, with increasing loadings of filler particle volume, the true fracture stress, as determined by $\beta_F$, decreases more rapidly than the yield stress, as determined by $\beta_Y$. Where the selected polymer material can sustain longer amounts of ductile drawing with increased amounts of filler particle loading, the resultant stretched film 40 can exhibit larger levels of porosity, and higher levels of strength and ductility.

The critical filler content (V*) at the ductile-to-quasi-brittle transition can be determined from the condition that true yield stress is equal to the true fracture stress, and can be represented by $$V^* = [(\sigma_{FP} - \sigma_{YP})/(\beta_F \sigma_{FP} - \beta_Y \sigma_{YP})]^{3/2} \tag{5}$$

This equation indicates that the critical filler content, the content at which the composite, filled polymer layer loses its drawability and embrittles, can be controlled by selecting a matrix polymer material having an appropriate difference between its true fracture stress and yield stress. In particular, the ductility can be maintained with high levels of filler content when the polymer resin exhibits a greater amount of strain hardening (increased true fracture stress), and exhibits a larger difference between its true fracture stress and its yield stress.

With reference again to FIG. 1, the method and apparatus for making the porous film 40 includes a supply system which provides and delivers the constituent component materials desired for producing a selected source material 28. In the representatively shown configuration, a treating mechanism, such as a mixing device 20, can be configured to operably apply a surface-active material to a selected constituent component. The shown arrangement, for example, is configured to impart an operative hydrophilic function to a supply of particulate filler material 22. Optionally, the technique of the invention can be configured to incorporate the surface-active material into a supply of the thermoplastic, polymer resin material 26.

The component materials employed to form the source material for the film may be suitably intermixed or otherwise combined at various locations along the method and apparatus. For example, the component polymer materials and supplemental materials may be combined at a mixer prior to melting. Alternatively, the components may be combined in a mixer after melting, and optionally, may be combined within an extruder 24. In addition a combination of such mixing techniques may be employed.

A compounding step can include the melt blending of the surface-modified filler with the selected polymeric resin. The compounding can be done by employing any operative type of melt mixing equipment which provides a sufficient level of filler dispersion and distribution. For example a FARREL high-intensity mixer, or other appropriate type of compounding equipment may be employed. Desirably, the components are combined in a single screw or twin-screw extruder, and the extruder can further include a static mixer to provide improved process efficiency due to improved dispersion of the filler and surfactant materials, and due to reduced agglomerations in the extruded material.

An example of a suitable extruder is an lab scale HMKE conical twin screw extruder, Rheomex TW 100. The extruder contains a pair of a conical screws with a length/diameter (L/D) ratio of about 10/1. Such an extruder is available from HMKE, a business having offices in Paramus, N.J.

In the representatively shown configuration, the selected component materials from the particle supply 22 and the polymer supply 26 are delivered to the extruder 24 which further processes the component materials to form the desired film-forming, source material 28. The component materials are suitably melted and intermixed by the extruder to generate the desired source material 28. The illustrated arrangement can, for example, be constructed to provide the source material in the form of pellets which may be convenient for further transport and processing.

The prepared source material can then be processed to generate one or more precursor polymer layers 32. In particular, the selected source material is operably transported or otherwise delivered to a mechanism which converts the source material 28 into at least one substantially continuous filled polymer layer 32. Films or sheets of resulting filled resin can be fabricated by a convenient technique, such as blowing, compression molding and/or casting. For the representative example of extrusion film casting, a HAAKE twin screw extruder can be employed with a 4-inch slit die attached. A chilled wind-up roll maintained at 15°–20° C. can be employed to collect the resultant polymer film layer.

The polymer layer 32 can be pretreated to prepare the layer for the subsequent stretching operation. The pretreatment can be done by annealing the resulting film at elevated temperatures, by spraying the polymer layer with a surface-active fluid (such as a liquid or vapor form of the surface-active material employed to surface-modify the filler material), by modifying the physical state of the polymer in the layer 32 with a ultraviolet radiation treatment, an ultrasonic treatment, a high-energy irradiation treatment, and/or other non-direct contact treatment, or a supercritical fluid treatment. In addition, the pretreatment of the polymer layer 32 may incorporate a selected combination of two or more of the foregoing techniques.

A suitable formation-stretching mechanism, such as provided by a uniaxial or biaxial stretching device 38, operatively elongates the polymer layer 32 along an appointed machine-direction (MD) 50. Additionally, the stretching device can be configured to operatively elongate the polymer layer 32 along an appointed transverse-direction (TD) 52 to provide at least a biaxial stretching of the layer. The MD and TD are each aligned substantially along a plane generally defined by the polymer layer 32, and the TD is substantially perpendicular to the MD.

An example of a suitable stretching device is a TM LONG Standard Stretcher, which is available from T. M. LONG CO. INC., a business located in Somerville, N.J. Other conventional stretching devices, such as a Bruckner laboratory stretcher, or a Marshall and Williams film orienter, may also be employed.

The process of generating the desired microporous structure can include a substantially elastic stretching of the filled polymer resin layer 32 having intact interfaces between the polymer and the particles of filler material, a debonding of the filler particles from the polymer resin as a result of accumulated elastic energy in the vicinity of the particles, a plastic deformation of the polymer resin and growth of generated voids during a drawing elongation of the polymer layer, and a plastic failure of a selected portion the stretched polymer ligaments between voids to provide a void coalescence. The debonding step typically requires a low interfacial energy and a low adhesion between the filler particles and polymer resin. The void growth step proceeds at a high stress level or high temperature, and the void coalescence process develops at high filler loading and high stretch ratios.

A uniaxial stretching of the polymer layer 32 typically generates isolated and elongated voids. A biaxial stretching of the polymer layer 32, however, can provides more effective conditions for the selected coalescence of the voids and the formation of the desired interconnected porous structure with substantially spherical or elliptical void shapes. The biaxial stretching can be conducted sequentially or substantially simultaneously. It has been found that the pore size, number of pores, and pore coalescence process can be controlled by the filler particle size, filler particle size distribution, interfacial energy (debonding efficiency), and filler spacing (filler loading). In addition, the conditions and modes of the stretch processing, such as the selection of the stretching temperature, rate of stretching, draw ratio(s), uniaxial stretching, simultaneous biaxial stretching or sequential biaxial stretching, can help determine the resultant pore shape and size, as well as the interconnectivity of the porous structure. Thus, the porous morphology within the final porous film 40 can be controlled by various factors during the compounding or material development phase, as well as during the processing or stretching phase.

The formation of the desired microporous structures can optionally be controlled by stretching the filled polymer resin while the polymer layer 32 is in an operative contact with a suitable supply of a formation-quantity of surface-active fluid, which may be in the form of a gas or liquid and is provided by an applicator device 44. For example, the formation stretching of the polymer layer 32 can be conducted while the polymer layer is operatively contacted with a bath of the desired surface-active liquid.

The surface-active fluid can advantageously reduce the surface energy between the film material and its immediate environment. An absorption of the surface-active fluid at the new interfaces of the polymer layer 32 can also reduce the surface tension and, when coupled with stress-assisted plastification of a polymer resin caused by a diffusion of the surface-active fluid into the polymer material, can facilitate an improved nucleation and growth of microvoids. While stretching the filled polymer resin in a contact with the surface active fluid, the microvoids can be initiated at structural irregularities or other physical non-homogenities, or microdefects of the polymer layer material. Such initiators, structural non-homogenities, can be provided by one or more of the following mechanisms: particulate filler/polymer resin interfaces; density and/or modulus fluctuations in a film material; submicron size voids and/or air bubbles; and any type of inclusions having a modulus and/or density which varies from that of the polymer resin, as well as combination of these mechanisms.

The assisted stretching of the polymer layer 32 while the layer is in an effective contact with the surface-active fluid can provide a significant reduction in the surface energy of the polymer material that is in contact with the surface-active fluid, and can provide a broader variety of initiators for the nucleation of microvoids, as compared to a stretching of the polymer layer in air. Desirably the surface-active fluid is capable of providing for a surface tension which is less than the critical surface tension of the film material. In particular aspects of the invention, the selected surface-active fluid can be configured to provide for a surface tension which is less than the critical surface tension of the thermoplastic, orientable polymer material employed to form the layer 32. For example, where the polymer is polyethylene with a surface tension of about 31 dynes/cm, the surface-active fluid can be selected to provide for a surface tension which is less than the 31 dynes/cm. Similarly, where the polymer is polypropylene with a surface tension of about 30 dynes/cm, the surface-active fluid can be selected to provide for a surface tension which is less than the 30 dynes/cm.

Desired surface-active and/or plasticizing environments can, for example, be provided by the operative presence of various alcohols, e.g. n-propanol; organic solvents and plasticizing fluids, e.g. heptane; and various supercritical fluids which are known to exhibit a unique combination of solvent and transport properties. Other examples of suitable surface-active fluids include, for example, pure isopropanol, isopropanol with a small amount of water (e.g. less than 10 wt % water), and/or any other fluids or fluid mixtures which can provide for an operative surface tension.

To more fully utilize the various effects of the filler particles, the biaxial stretching process was used in this study to create the unique porous structure and desired functional properties. In typical one-dimensional stretching, the film is only stretched in the machine direction. In general, the pores generated by this method have a tendency to be elongated and eventually collapsed, resulting in reduced pore area. On the other hand, the biaxial stretching would allow us to open up the elongated and/or collapsed pore to further increase the pore area. In addition, the TD tension would allow the processed film to have a better dimension stability during process. The key parameters in the biaxial stretching include stretching ratio, stretching strain rate, and stretching temperature. In addition, the grip pressure to hold the film for stretching, the sequence of the stretching mode (TD vs. MD), and the equilibrium time are all important for the successful production of biaxially-stretched films with a good balance of high porosity and good mechanical properties.

In particular aspects of the invention, the draw or stretching system can be constructed and arranged to generate a draw ratio which is not less than about 1 in both the machine and transverse directions. The draw ratio is the ratio determined by dividing the final stretched length of the polymer layer by the original unstretched length of the polymer layer along the direction of stretching. The draw ratio in the machine-direction (MD) can be not less than a minimum of about 1.1. Desirably, the draw ratio is not less than about 1.2, and optionally, is not less than about 1.5. In other aspects, the stretching draw ratio in the MD can be not more than a maximum of about 10. Alternatively, the MD draw ratio can be not more than about 7, and optionally can be not more than about 5 to provide desired effectiveness.

The stretching draw ratio in the transverse-direction (TD) is desirably not less than about 1. Alternatively, the draw ratio in the TD can be not less than 1.2, and optionally is not less than about 1.5. In other aspects, the stretching draw ratio in the transverse-direction can not be more than about 10. Alternatively, the stretching draw ratio in the TD can be not more than about 7, and optionally can be not more than about 5 to provide desired effectiveness.

The biaxial stretching can be accomplished simultaneously or sequentially. With the sequential, biaxial stretching, the first, initial stretching can be conducted in either the machine-direction or the transverse-direction.

During stretching, the film sample can optionally be heated. The TM LONG film stretcher, for example, can provide film heating by using two air heaters; one can be positioned above the sample and the other can be positioned below the sample. Each air heater has a separate controller to adjust its temperature. The two air temperatures are measured at the specimen and recorded. Temperature of the specimen cannot be measured directly with reasonable accuracy. For that reason, a less direct but more accurate method may be used. The sample can brought to equilibrium with air streams which are provided at particular, accurately measured air temperature and are directed to each side of the polymer layer appointed for stretching. The minimum time for temperature of the sample to reach equilibrium with the temperature of the air streams was about 10 min. Accordingly, the sample was exposed to the heated air streams for 10 min prior to stretching. The stretching of the polymer layer sample is desirably conducted at a drawing temperature which is at least about 0° C. Alternatively, the drawing temperature is at least about 10° C., and optionally is at least about 18° C.

In general, the stretching should be conducted at temperatures below the melting temperature of the polymer layer sample. In particular aspects, the drawing temperature is not more than about 170° C. Alternatively, the stretching and drawing temperature is not more than about 130° C., and optionally is not more than about 80° C. When drawing temperature is too high, polymer layer sample may become excessively tacky and may become difficult to handle. In addition, excessively high temperatures may decrease the efficiency of the system and excessively reduce the generation of the desired micropores Stretching at the lower temperature may promote a more efficient debonding of the filler particles from the polymer resin material, and can promote the desired growth of the micropores.

After gripping the polymer layer sample for the various stretching operations, the sample can be pre-tensioned to hold it flat for more even heating. This can be accomplished by employing conventional constant force controls to apply a small tension to take up any "slack" in the sample.

In further aspects, the invention can be configured to deliver the porous film at a stretching rate of at least about 50%/min (50% per minute), as determined with respect to its initial length at the beginning of the stretching. Alternatively, the porous film can be delivered at a rate of at least about 100%/minute, and optionally can be delivered at a rate of at least about 500%/minute. In other aspects of the invention, the porous film can be delivered at a rate within the range of up to about 5000%/minute, or more. Alternatively, the porous fiber can be delivered at a rate of up to about 4000%/minute, and optionally can be delivered at a rate of up to about 2500%/minute.

In other aspects of the invention, the formation stretched, porous film can then be delivered to a post-treatment device 42, such as a device which provides a heat setting or annealing operation. During the post-treatment operation, the stretched film may be held under tension at elevated temperatures. Other additional post-treatment processes or operations, such as a UV treatment, a ultrasonic treatment, a supercritical fluid treatment, as well as combinations thereof can be incorporated to modify the morphological state of the final stretched film.

The heat treatment may, for example, be provided by an operative heating chamber which optionally, may be the same heating chamber as utilized for the stretching operation. The heat-setting step may be optional when the film is composed of particular types of materials, such as a polyolefin material, but may be required when the films are composed of other materials, such as a polyester. The heat setting operation can help preserve the porous structure produced within the film sample, and can help protect the resulting structure against shrinkage, especially when the porous film in intended for use in extremely hot weather. Suitable heat setting temperatures can be within the range of about 20° C. up to the melting temperature of the polymeric material. For example, heat setting temperatures within the range of about 60° C. to about 120° C. have been found to be desirable. During the heat setting operation, the film sample is held stretched to the desired stretch ratio to substantially avoid shrinkage of the film and to effectively maintain the porous structure within the film during the heat setting. The heat-setting process can be conducted in accordance with a selected, predetermined temperature-time profile.

In its various aspects, the technique of the present invention can provide a porous film 40 which exhibits improved combinations of pore shape, pore size, pore distribution, film modulus, film tensile strength, and/or film elongation-to-break, as well as desired levels of breathability, wettability and/or water absorption.

The various arrangements of the invention can also provide a porous film 40 having a relatively low thickness. In particular aspects, the porous film can have a film thickness of not more than about 1 mm. Alternatively, the porous film thickness can be not more than about 0.5 mm, and optionally, can be not more than about 0.3 mm. In other aspects, the porous film can have a thickness of about 0.01 mm, or less, and optionally can have a thickness of about 0.05 mm, or less to provide improved performance.

In other aspects, the technique of the invention can provide a porous film having tensile strength in a first, machine direction (MD) of not less than about 6 Mega-Pascal (MPa). Alternatively, the tensile strength can be not less than about 10 MPa, and optionally can be not less than about 15 MPa. In other aspects, the method and apparatus of the invention can provide for a microporous film tensile strength in the MD not more than about 300 MPa. Alternatively, the MD film tensile strength can be not more than about 100 MPa, and optionally can be not more than about 40 MPa to provide improved performance and processibility during subsequent manufacturing operations.

In further aspects, the invention can provide a film tensile strength in a second, transverse direction (TD) which is not less than about 6 MPa. Alternatively, the TD tensile strength can be not less than about 9 MPa, and optionally can be not less than about 12 MPa. In other aspects, the microporous film can have TD strength of not more than about 300 MPa. Alternatively, the TD film strength can be not higher than 100 MPa, and optionally can be not more than 30 MPa.

In still other aspects, the invention can provide a porous film 40 which exhibits a percent elongation-at-break of not less than about 30%, as determined by the formula:

$$100*(L_f-L_i)/L_i;$$

where $L_f$ is the final length of a film sample at break, and $L_i$ is the initial length of the film sample prior to elongation. Alternatively, the elongation-at-break can be not less than 100%, and optionally can be not less than about 150%. In other aspects, the microporous film can have MD elongation-at-break of not more than about 1500%. Alternatively, the MD elongation-at-break can be not more than about 1000%, and optionally, can be not more than about 500%.

Other aspects of the invention can provide a porous film with an elongation-at-break of not less than about 50% in the transverse direction. Alternatively, the TD elongation-at-break can be not less than about 100%, and optionally can be not less than about 150%. In other aspects, the microporous film can have an elongation-at-break, in the TD, of not more than about 1500%. Alternatively, the TD elongation-at-break can be not more than about 1000%, and optionally can be not more than about 500%.

Particular aspects of the invention can provide a porous film having an elastic, Young's modulus, in the machine direction, of not less than about 1 MPa. Alternatively, the MD modulus can be not less than about 5 MPa, and optionally can be not less than about 10 MPa. In other aspects, the microporous film can have a MD modulus of not more than about 500 MPa. Alternatively, the MD modulus can not be more than about 100 MPa, and optionally, can be not more than about 50 MPa.

Further aspects of the invention can provide a porous film having a Young's modulus, in the transverse direction, of not less than about 1 MPa. Alternatively, the TD modulus can be not less than about 3 MPa, and optionally, can be not less than about 5 MPa. In other aspects, the microporous film can have a TD modulus of not more than about 500 MPa. Alternatively, the TD modulus can be not more than about 100 MPa, and optionally, can be not more than about 35 MPa.

In additional aspects, the invention can provide a porous film which can advantageously exhibit an enhanced WVTR value. In particular, the WVTR of the porous film can be not less than about 500 g/sq.m/24 hr/mil (grams per square meter, per 24 hours, per 0.001 inch of film thickness). Alternatively, the WVTR can be not less than about 5,000 g/sq.m/24 hr/mil, and optionally, can be not less than about 10,000 g/sq.m/24 hr/mil. In other aspects, the WVTR can be not more than about 60,000 g/sq.m/24 hr/mil. Alternatively, the WVTR value can be not more than about 30,000 g/sq.m/24 hr/mil, and optionally, can be not more than about 20,000 g/sq.m/24 hr/mil.

In still other aspects, the porous film provided by the present invention can be hydrophilic. Desirably, the contact angle with water of the porous film can be approximately 0° (degrees). Alternatively, the contact angle can be not less than about 3 degrees, and optionally, can be not less than about 5 degrees. In other aspects, the contact angle can be not more than about 85 degrees. Alternatively, the water contact angle can be not more than about 75 degrees, and optionally, can be not more than about 70 degrees.

The hydrophilic microporous film provided by the technique of the present invention can also advantageously exhibit improved water accessibility. In particular aspects, the invention can provide a hydrophilic porous film having a water uptake rate which can be not less than about 0.01 mg/sec. Alternatively, the water uptake rate can be not less than about 0.03 mg/sec, and optionally can be not less than about 0.06 mg/sec. In other aspects, the water uptake rate can be not more than about 10 mg/sec, alternatively, can be not more than about 5 mg/sec, and optionally can be not more than about 2 mg/sec.

In additional aspects, the provided water uptake amount of the hydrophilic porous film can be not less than about 0.1 mg/mg in 60 sec. Alternatively, the water uptake amount can be not less than about 0.5 mg/mg in 60 sec, and optionally can be not less than about 1 mg/mg in 60 sec. In other aspects, the water uptake amount can be not more than about 40 mg/mg in 60 sec. Alternatively, the water uptake amount can be not more than about 15 mg/mg in 60 sec, and optionally can be not more than about 5 mg/mg in 60 sec to provide improved benefits.

Further aspects of the invention can provide a microporous film having an enhanced surface texture, which can provide improved air circulation and tactile properties. The surface texture of the microporous film can have the average peak height of not less than about 0.45 microns (μm). Alternatively, the microporous film can have a surface texture with an average peak height which is not less than about 0.65 microns, and optionally, is not less than about 0.8 microns. In other aspects, the microporous film can have the surface texture with an average peak height of not more than about 30 microns. Alteratively, the average peak height can be not more than about 10 microns, and optionally, can be not more than about 5 microns to provide desired tactile and physical properties.

Suitable testing techniques for obtaining the data for determining the various properties the porous film are further described in U.S. patent application Ser. No. 931,574 entitled MICROPOROUS FILMS WITH IMPROVED PROPERTIES, filed Sep. 16, 1997 by V. A. Topolkaraev et al. (attorney docket No. 12,287), the entire disclosure of which is hereby incorporated by reference in a manner that is consistent herewith.

The technique of the invention can generate a plurality of the voids or pores which impart the desired porosity to the film 40. The pores can be distributed over the outer surface of the film and can also be distributed through the interior of the film. In particular configurations, the porous structure of the film 40 includes elongate voids of generally ellipsoidal shape, and/or voids having a substantially spherical shape. Desirably, the elongate voids have their major axes aligned substantially along an direction or axis of the film which has been subjected to a relatively higher draw ratio. In particular aspects of the invention, the elongate voids can have a longer, major axis length which is at least about 0.05 microns ($\mu$m). Alternatively, the length of the major axis of the voids can be at least about 0.2 $\mu$m, and optionally can be at least about 1 $\mu$m. In other aspects, the length of the major axis of the voids can be not more than about 100 $\mu$m. Alternatively, the major axis length of the voids can be not more than about 50 $\mu$m, and optionally can be not more than about 20 $\mu$m to provide improved performance.

To help provide for the desired combination of mechanical strength and water accessibility, particular aspects of the invention have films in which the voids of desired pore size dimensions constitute at least about 98% of the total number of pores on either or both of the film outer surface or film cross-section. Alternatively, the voids of the desired pore size dimensions constitute at least about 70%, and optionally constitute at least about 50% of the total number of pores on either or both of the film outer surface or film cross-section.

In further aspects of the porous films of the invention, the voids having a major axis length within the range of about 0.05–100 $\mu$m constitute at least about 98% of the total number of pores on either or both of the film outer surface or film cross-section. Alternatively, the voids of the 0.2–50 $\mu$m pore size dimensions constitute at least about 70%, and optionally constitute at least about 50% of the total number of pores on either or both of the film outer surface or film cross-section to provide improved mechanical and water accessibility properties.

The elongate pores or voids can also have an aspect ratio value which is determined by the ratio of the length of the pore major axis to the length of a pore minor axis. In further aspects of the invention, the aspect ratio is not less than about 1. Alternatively, the aspect ratio is not less than about 1.2, and optionally is not less than about 1.5. In other aspects, the aspect ratio is not more than about 30. Alternatively, the aspect ratio is not more than about 15, and optionally is not more than about 10 to provide improved porosity characteristics and film performance. The major axis of each elongate pore or void is typically an axis aligned substantially along the longitudinal dimension of the film, and can typically be represented by the largest length measurement of each pores. The minor axis of the pore is aligned substantially parallel to a major, facing surface of the porous film, and is aligned perpendicular to the major axis, as observed in the photomicrograph or other imaging or measuring mechanism employed to determine the aspect ratio.

The porous structure of the film 40 can have surface-open pores distributed across either or both of the outer, major surfaces of the film. The surface pores can have a distribution with a pore number per unit of outer surface area of not less than about 100 per square millimeter (mm$^2$). Alternatively, the pore number per unit of outer surface area is not less than about 1000/mm$^2$, and optionally is not less than about 5000/mM$^2$. In further aspects, the pore number per unit of outer surface area is not more than about 500,000/mm$^2$. Alternatively, the pore number per unit of outer surface area is not more than about 100,000/mm$^2$, and optionally is not more than about 50,000/mm$^2$ to provide improved wettability and liquid penetration.

The porous structure of the invention, with respect to the cross-sectional area of the film 40, can exhibit pore voids with an average pore area (per pore) of not less than about 0.03 micron$^2$ ($\mu$m$^2$). Alternatively, the average pore area (per pore) is not less than about 0.1 $\mu$m$^2$, and optionally is not less than about 0.5 $\mu$m$^2$. In other aspects, the average pore area (per pore) is not more than about 100 $\mu$m$^2$. Alternatively, the average pore area (per pore) is not more than about 30 $\mu$m$^2$, and optionally is not more than about 10 $\mu$m$^2$ to provide improved wettability and liquid penetration.

The porous structure of the film 40 can also have pores distributed along its cross-sectional area to provide a pore number per unit area which is not less than about 0.01/$\mu$m$^2$. Alternatively, the pore number per unit of area is not less than about 0.03/$\mu$m$^2$, and optionally is not less than about 0.1/$\mu$m$^2$. In other aspects, the pore number per unit area is not more than about 30/$\mu$m$^2$. Alternatively, the pore number per unit area is not more than about 10/$\mu$m$^2$, and optionally is not more than about 2/$\mu$m$^2$ to provide improved wettability and liquid penetration.

In further aspects, the porous structure of the film 40 has pores distributed along the film cross-section wherein a sum of the areas of the individual, cross-sectioned pores provides a total pore area which not less than about 5% of the total area encompassed by the cross-sectioned film (a percent pore area of not less than about 5%). Alternatively, the percent pore area is not less than about 10%, and optionally is not less than about 15%. In other aspects, the percent pore area is not more than about 70%. Alternatively, the percent pore area is not more than about 60%, and optionally is not more than about 40% to provide improved wettability and liquid penetration.

In contrast, particular aspects of the porous film of the invention can include pores which are bounded by tensile-stressed, elongated pore walls composed film material which has undergone a selected amount of plastic deformation. The stressed regions can be observed at least along boundary edges of the extended, surface voids present on the exposed, outermost surface of the film.

Examples of porous films which can be produced with the technique of the invention are described in above-mentioned U.S. patent application Ser. No. 931,574 entitled MICROPOROUS FILMS WITH IMPROVED PROPERTIES, filed Sep. 16, 1997 by V. A. Topolkaraev et al. (attorney docket No. 12,287).

The following examples are to provide a more detailed understanding of the invention. The examples are representative and are not intended to limit the scope of the invention.

EXAMPLE 1

A CaCO$_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a resin composed of an ethylene-octene-1 copolymer (DOWLEX NG 3347A supplied by Dow Plastics) by using a FARREL high shear mixer (Heritage Plastics Inc.). The CaCO$_3$ mean particle size was about 1 micron, and the concentration of $CaCO_3$ was 43.4 wt % (based on the total weight of the resin, filler, and surfactant) as measured by the ashes analysis. The DOW CORNING 193 silicone glycol surfactant had a HLB number of 12.2. The film material was cast using a laboratory HAAKE twin screw extruder operating at 60 rpm, with a 4" film die at a temperature of 185° C., and with chill rolls. The cast film had a thickness of about 10 mil. The film then was stretched at 60° C. in air by a factor of 3.5X in its machine direction (MD) and by a factor of 2.5X in its transverse direction (TD) sequentially using a T. M. Long film stretcher. After the release of the film from the stretcher, the area stretch ratio of the relaxed film was measured. The measured stretch ratio was 2.8X in its MD and 2X in its TD (area stretch 5.6X). The mechanical properties of the stretched film were measured with a SINTECH tensile tester in both the MD and TD. (Table 1) The surface microtopography of the film sample was evaluated by stylus profilometry. The microporous structure of the film sample was analyzed by SEM, and the water accessibility was measured using a CAHN DCA 322 microbalance (Table 1). The water vapor transmission rate (WVTR) was measured by the cup method (Table 1), and the contact angle with distilled water was measured using an image analysis of a high speed video recording of water micro-drops on the surface of the film sample. (Table 1).

EXAMPLE 2

Particles of $CaCO_3$ (SUPERMITE from ECC International) filler material were surface-modified with DOW CORNING 193 silicone glycol surfactant (Dow Corning Corporation) in an acetone-surfactant solution. The surfactant content was 6 wt % based on the weight of the filler, as determined by thermal gravimetric analyses (TGA). The modified filler particles were intermixed with a resin composed of an ethylene-octene-1 copolymer (DOWLEX NG 347A supplied by Dow Plastics) by extruding the combined materials twice through a laboratory HMKE twin screw extruder. The concentration of $CaCO_3$ was 38.2 wt % (based on the total weight of the resin, filler, and surfactant) as measured by the ashes analysis. The film material of the example was cast using a laboratory Haake twin screw extruder operating at 60 rpm, with a 4" film die at temperature 185° C., and with chill rolls. The cast film had a thickness of about 10 mil. The film was then stretched at 60° C. in air by a factor of 3.5X in its machine direction (MD) and by a factor of 2.5X in its transverse direction (TD) sequentially using a T. M. Long film stretcher. The stretch ratio of the relaxed film was measured as of 2.28X in the MD and 1.97 in the TD. The mechanical properties of the stretched film were measured in the MD and TD, as well as water uptake rate and water uptake amount, and are summarized in the Table 1.

EXAMPLE 3

Particles of $CaCO_3$ (SUPERMITE® from ECC International) filler material were modified by a coating treatment with 6 wt % (based on the weight of the filler) of DOW CORNING 193 silicone glycol surfactant (Dow Corning Corporation). The modified filler particles were intermixed with a resin composed of an ethylene-octene-1 copolymer (DOWLEX NG 3347A supplied by Dow Plastics) by using a FARREL high shear mixer (Heritage Plastics Inc.). The concentration of $CaCO_3$ was 43.4 wt % (based on the total weight of the resin, filler, and surfactant) as measured by the ashes analysis. A blown film of 1 mil thick was produced from the resultant film material composition. The surface microtopography, mechanical properties in both its MD and TD, as well as the contact angle with distilled water, and WVTR were measured for this film (Table 1).

EXAMPLE 4

Particles of $CaCO_3$ (SUPERMITE from ECC International) filler material were modified by a coating treatment with 6 wt % (based on the weight of the filler) of DOW CORNING 193 silicone glycol surfactant (Dow Coming Corporation). The modified filler particles were intermixed with a resin composed of an ethylene-octene-1 copolymer (DOWLEX NG 3347A supplied by Dow Plastics) by employing a FARREL high shear mixer (Heritage Plastics Inc.). The concentration of $CaCO_3$ was 43.4 wt % (based on the total weight of the resin, filler, and surfactant) as measured by the ashes analysis. The film material was cast using laboratory HAAKE twin screw extruder operating at 60 rpm, with a 4" film die at temperature 185° C., and with chill rolls. The cast film had a thickness of about 10 mil. The film was then stretched at 60° C. in air by a factor of 3.5X in its machine direction (MD) and by 2.5X in its transverse direction (TD) simultaneously using T. M. Long film stretcher. The stretch ratio of the relaxed film was measured as of 3.3X in the MD and 1.95X in the TD. The tensile properties of this film in MD and TD, as well as WVTR, and the contact angle were measured for this film and are summarized in Table 1.

EXAMPLE 5

A resin composed of an ethylene-octene-1 copolymer (DOWLEX NG 3347A supplied by Dow Plastics) was intermixed with particles of $CaCO_3$ (SUPERMITE from ECC International) filler material. The concentration of the $CaCO_3$ was 50 wt % (based on the total weight of the resin and filler). The blown film of 1 mil thick was produced from the above composition. The tensile properties of this film in the MD and the TD, as well as the water uptake performance and the water contact angle were measured for this film and are summarized in Table 1.

EXAMPLE 6

Particles of $CaCO_3$ (SUPERMITE from ECC International) filler material were modified by treatment with 6 wt % (based on the weight of the filler) of DOW CORNING 193 silicone glycol surfactant (Dow Coming Corporation). The modified filler particles were intermixed with a resin composed of an ethylene-octene-1 copolymer (DOWLEX NG 3347A supplied by Dow Plastics) by using a FARREL high shear mixer (Heritage Plastics Inc.). The concentration of the $CaCO_3$ was 43.4 wt % (based on the total weight of the resin, filler, and surfactant) as measured by the ashes analysis. The film material was cast using a laboratory HAAKE twin screw extruder operating at 60 rpm, with a 4" film die at temperature 185° C., and with chill rolls. The cast film had a thickness of about 10 mil. The film was then stretched at 60° C. in air by a factor of 3.5X in its MD using a T. M. Long film stretcher. The stretch ratio of the relaxed film was measured as of 3.03X in the MD and 0.98X in its TD. The contact angle and water uptake were measured for this film, as well as tensile properties in MD, and are summarized in Table 1.

EXAMPLE 7

Particles of $CaCO_3$ (SUPERMITE from ECC International) filler material were modified by treatment with 6 wt % (based on the weight of the filler) of DOW CORNING 193 silicone glycol surfactant (Dow Corning Corporation). The modified filler particles were intermixed with a resin composed of an ethylene-octene-1 copolymer (DOWLEX NG 3347A supplied by Dow Plastics) by using a FARREL high shear mixer (Heritage Plastics Inc.). The concentration of the $CaCO_3$ was 43.4 wt % (based on the total weight of the resin, filler, and surfactant) as measured by the ashes analysis. The film was cast using a laboratory HAAKE twin screw extruder operating at 60 rpm, 4" film die at temperature 185° C., and the chill rolls. The cast film has a thickness of about 10 mil. The film then was stretched at RT in air by 4.5X in MD using a SINTECH tensile tester. The contact angle and water uptake have been measured for this film, as well as tensile properties in MD, and are summarized in Table 1.

EXAMPLE 8

Particles of $CaCO_3$ (SUPERMITE from ECC International) filler material were modified by treatment with 6 wt % (based on the weight of the filler) of IGEPAL RC 630 surfactant (Rhone-Poulenk INC.). The modified filler particles were intermixed with a resin composed of an ethylene-octene-1 copolymer (DOWLEX NG 3347A supplied by Dow Plastics) by extruding the combined materials twice through a laboratory HAAKE twin screw extruder. The concentration of $CaCO_3$ was about 45 wt % (based on the total weight of the resin, filler, and surfactant). The IGEPAL RC 630 surfactant had a HLB number of 12.7. The film was cast using a laboratory HAAKE twin screw extruder operating at 60 rpm, with a 4" film die at temperature 185° C., and with chill rolls. The cast film had a thickness of about 10 mil. The film was then stretched at room temperature in air by a factor of 4.5X in its MD using a SINTECH tensile tester. The water contact angle and water uptake data, as well as the tensile properties in the MD, were measured for this film and are summarized in Table 1.

EXAMPLE 9

This sample was composed of commercially available microporous polypropylene film, CELGARD 2500, having gauge of 1 mil and available from Hoechst Celanese Corporation, a business having offices located in Charlotte, N.C. The properties of the film were measured and are summarized in the Table 1.

EXAMPLE 10

This sample was composed of commercially available microporous polypropylene film, ELGARD 2500, obtained from Hoechst Celanese Corporation. The microporous film had gauge of 1 mil, and was surfactant modified by immersing in a solution of 10 wt % hydrophilic silicon glycol (DOW CORNING 193) surfactant in acetone for 1 hour and drying at 50° C. for 6 hours before testing. The water uptake of the modified microporous film has been measured, as well as tensile properties, and are summarized in Table 1.

EXAMPLE 11

This sample was composed of semi-commercially available (pilot plant production) biaxially stretched filled polyolefin film, received from Mitsubishi Petrochemical Co., LTD., a business having offices in Tokyo, Japan. The concentration of $CaCO_3$ in the film was 60 wt %. The properties of the film were obtained from a second source and are summarized in Table 1.

EXAMPLE 12

This sample was composed of commercially available stretched filled polyolefin film, available from KAO Corp., a business having offices in Japan. The concentration of $CaCO_3$ in this film was 54 wt %. The properties of the film were obtained from a second source and are summarized in Table 1.

TABLE 1

|  | Units | Ex. #1 | Ex. #2 | Ex. #3 | Ex. #4 | Ex. #5 | Ex. #6 | Ex. #7 | Ex. #8 | Ex. #9 | Ex. #10 | Ex. #11 | Ex. #12 |
|---|---|---|---|---|---|---|---|---|---|---|---|---|---|
| Gauge | mil | 4 | 6 | 1 | 4 | 1.2 | 7 | 3 | 3 | 1 | 1 | 2.7 | 1.26 |
| Tensile Strength | MPa | | | | | | | | | | | | |
| MD | | 17 | 24 | 31 | 19.4 | 19.7 | 21.5 | 48.6 | 52.2 | 81.3 | 93.4 | 12.5 | 20 |
| TD | | 22.5 | 18 | 22 | 13.1 | 13.6 | | | | 16.1 | | 7.45 | 6.2 |
| Elongation | % | | | | | | | | | | | | |
| MD | | 177 | 307 | 376 | 130 | 360 | 148 | 44 | 50.4 | 44.3 | 66.7 | 120 | 290 |
| TD | | 178 | 384 | 531 | 326 | 666 | | | | 405 | | 85 | 560 |
| Modulus | MPa | | | | | | | | | | | | |
| MD | | 36.8 | 18.2 | 46.8 | 36.1 | 311.5 | 48.3 | 184 | 193.7 | 670.8 | 623.6 | 78.6 | 99.97 |
| TD | | 30.9 | 14.6 | | 6.1 | 253.9 | | | | 384.3 | | 58.6 | |
| WVTR | g/sq.m/24 h/mil | 16,000 | | 70.2 | 16,860 | | | | | 5000 | | 10,800 | 6048 |
| Contact angle | deg | | | | | | | | | | | | |
| ET = 0 sec | | 68.2 | | 36.2 | 67.8 | 87 | 47.4 | 71.3 | 69.5 | 90 | | >90 | |
| ET = 10 sec | | 58.4 | | <6 | 56.5 | 82.5 | 32.6 | 22 | 39.6 | | | | |
| Water uptake rate | mg/sec | 0.1 | 0.11 | 0.018 | 0.074 | 0.002 | 0.036 | 0.13 | 0.095 | | 0.008 | | |
| Water uptake | mg/mg | 2.28 | 1.54 | 0.86 | 1.78 | 0.077 | 0.55 | 1.97 | 1.57 | | 0.72 | | |

The comparative data shown in Table 1 indicate that the hydrophilic, porous films of the invention, particularly the biaxially stretched microporous films (e.g. Examples 1, 2, and 4) can demonstrate superior balance between mechanical performance and functional properties, as compared to conventional films known in the prior art (e.g. Examples #5, 9, 10, 11, and 12). The films can provide more balanced tensile properties in both the machine and transverse directions, can provide a low modulus, such as a modulus of not more than 40 MPa, and as a result, can exhibit high flexibility. The films of the invention can exhibit an improved specific breathability, such as a water vapor transmission rate which is in the range of about 16,000 g/sq.m/24 h/mil, can exhibit improved wettability, such as contact angles below 70 deg. The films can also exhibit improved water uptake potential in the range 1.5–2 mg/mg. In addition, the stretched films, particularly the biaxially stretched films, of the present invention can provide a distinctive surface-open interconnected porous morphology, and can provide a well-developed surface microtopography which can improve the tactile properties of the film.

Having thus described the invention in rather full detail, it will be readily apparent that various changes and modifications can be made without departing from the spirit of the invention. All of such changes and modifications are contemplated as being within the scope of the invention, as defined by the subjoined claims.

We claim:

1. A method for forming a porous film, comprising a stretching of a layer composed of a polymer material and at least about 5 wt % of a particulate filler material to form said porous film;

said particulate filler material having first been treated with an operative amount of surface-active material having a HLB value of not less than about 6 to provide surface modified filler particles, and said modified filler particles having been intermixed with said polymer material after having been treated with said surface-active material.

2. A method as recited in claim 1, wherein said layer of polymer material includes not less than about 10 wt % of said particulate filler material.

3. A method as recited in claim 1, wherein said layer of polymer material includes not more than about 90 wt % of said particulate filler material.

4. A method as recited in claim 1, wherein said stretching is provided at a stretching rate of up to about 5000%/min.

5. A method as recited in claim 1, wherein said stretching is provided at a stretching rate of up to about 4000%/min.

6. A method as recited in claim 1, wherein said stretching is provided at a stretching rate of at least about 50%/min.

7. A method as recited in claim 1, wherein said stretching is provided at a stretching rate of at least about 100%/min.

8. A method as recited in claim 1, wherein said stretching is provided along at a stretching draw ratio of not less than about 1.1.

9. A method as recited in claim 8, wherein said stretching is provided at a stretching draw ratio of not more than about 10.

10. A method as recited in claim 1, wherein said stretching is provided at a stretching draw ratio of not less than about 1.5.

11. A method as recited in claim 1, wherein said stretching is provided at a stretching draw ratio of not more than about 5.

12. A method as recited in claim 1, wherein said stretching of said layer comprises a biaxial stretching along a first direction and a second direction.

13. A method as recited in claim 12, wherein said stretching along said first direction is provided at a first, stretching draw ratio of at least about 1.5.

14. A method as recited in claim 13, wherein said stretching along said second direction is provided at a second, draw ratio of at least about 1.1.

15. A method as recited in claim 14, wherein said stretching along said first direction is provided at a first draw ratio of not more than about 5.

16. A method as recited in claim 15, wherein said stretching along said second direction is provided at a second draw ratio of not more than about 5.

17. A method as recited in claim 1, wherein said particulate material has been treated with at least about 2 wt % of said surface-active material.

18. A method as recited in claim 1, wherein said particulate material has an average particle size of not more than about 5 microns.

19. A method as recited in claim 18, wherein said particulate material has an average particle size of not less than about 0.2 microns.

20. A method as recited in claim 1, further comprising a quenching of said film after said stretching of said layer while said layer is substantially maintained in its stretched condition.

21. A method as recited in claim 1, further comprising a heat-setting of said film after said stretching of said layer while said layer is substantially maintained in its stretched condition.

22. A method as recited in claim 1, wherein said stretching includes an assisted stretching, with said layer in an operative contact with an effective, second volume of a surface-active fluid.

23. A method as recited in claim 22, wherein said effective, second volume of a surface-active liquid fluid has a HLB value of at least about 6.

* * * * *